United States Patent [19]
Fawkes

[11] 3,726,503
[45] Apr. 10, 1973

[54] PRESSURE SEAL FOR BUTTERFLY VALVES

[75] Inventor: Donald G. Fawkes, Aurora, Ill.

[73] Assignee: Henry Pratt Company, Aurora, Ill.

[22] Filed: Oct. 20, 1971

[21] Appl. No.: 191,026

[52] U.S. Cl. ................. 251/173, 251/175, 251/306, 251/307
[51] Int. Cl. .............................................. F16k 1/22
[58] Field of Search ..................... 251/172, 173, 306, 251/307, 308

[56] References Cited

UNITED STATES PATENTS

| | | | |
|---|---|---|---|
| 3,399,868 | 9/1968 | Fawkes | 251/308 X |
| 3,534,939 | 10/1970 | Frazier | 251/306 |
| 3,076,631 | 2/1963 | Grove | 251/173 |
| 3,409,269 | 11/1968 | Fawkes | 251/173 X |

*Primary Examiner*—Harold W. Weakley
*Attorney*—Hofgren, Wegner et al.

[57] ABSTRACT

A butterfly valve embodying an improved pressure seal. The valve includes a valve body having a fluid passage in which is a valve disc journaled for rotation between open and closed positions. A two member seal is arranged to contact the valve disc when the latter is in the closed position and the two members of the seal are constructed so that fluid under pressure may pass between an interface of the two members to the radially outermost side thereof to drive disc engaging, sealing noses of each of the members into firm sealing engagement with the disc.

8 Claims, 3 Drawing Figures

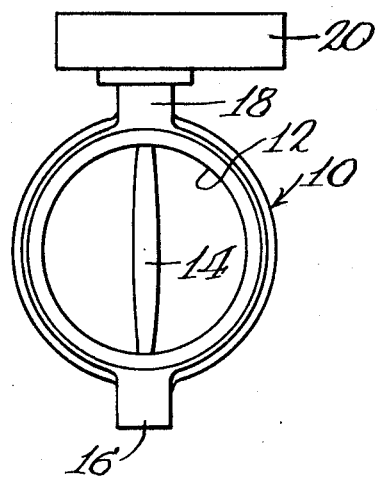
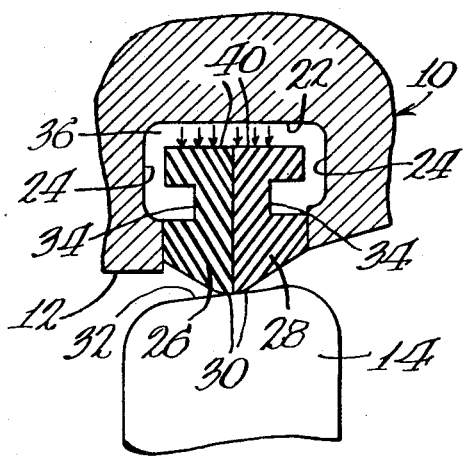
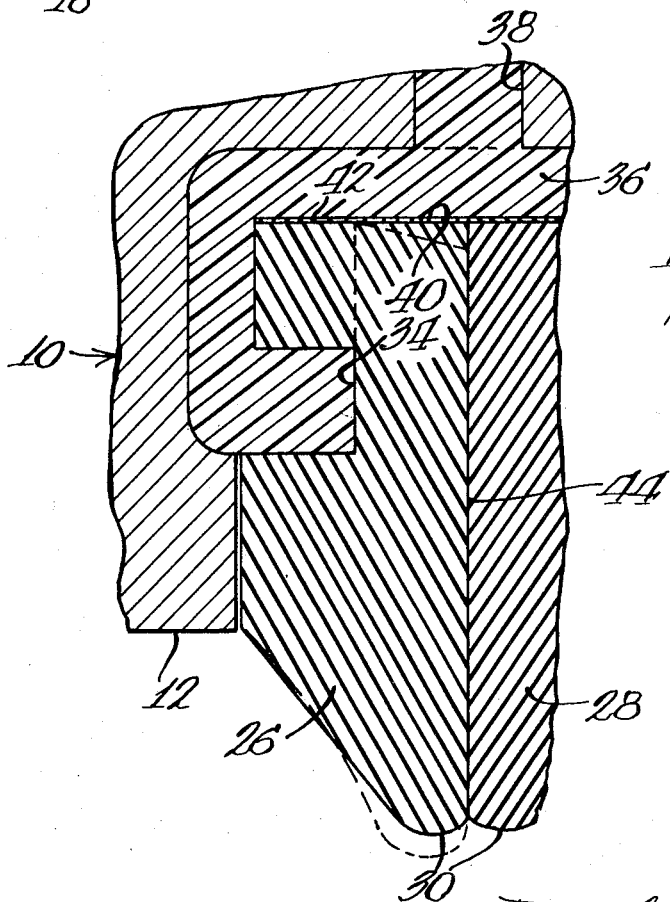
Inventor:
Donald G. Fawkes
By Hofgren, Wegner,
Allen, Stellman & McCord
Att'ys

PRESSURE SEAL FOR BUTTERFLY VALVES

BACKGROUND OF THE INVENTION

This invention relates to valves and, more particularly, butterfly valves having improved pressure seals.

There are in existence a number of butterfly valve constructions employing so-called "pressure" seals. Typically in such constructions, a resilient sealing member is disposed in annular relation to a fluid passage in such a position as to engage the periphery of a valve disc journaled within the passage for movement between open and closed positions. To augment the seal provided by the natural resilience of the sealing member against the valve disc when the latter is in a closed position, there is generally provided a pressure space behind the seal and some means of fluid communication between the pressure space and the high pressure side of the valve so that when the same is closed, fluid under pressure is directed to the pressure space to exert an inwardly directed pressure against the seal which in turn urges the latter into firm engagement with the periphery of the disc.

A principal difficulty with such constructions is the fact that sediment in the fluid will tend to accumulate in the pressure space to render, over a period of time, the pressure seal partially or wholly inoperative.

Some constructions have the further disadvantage in requiring machining operations to provide the flow path from the high pressure side of the valve to the pressure space, which machining operations are costly and contribute significantly to the cost of the valve.

SUMMARY OF THE INVENTION

It is the principal object of the invention to provide a new and improved pressure seal in a butterfly valve. More particularly, it is an object of the invention to provide a new and improved pressure seal which is constructed in such a way that long-run operability is not affected by sediment and which does not require costly machining operations to provide a high pressure fluid path to a pressure space behind a sealing member.

The exemplary embodiment of the invention achieves the foregoing object in a valve construction including a valve body having a fluid passage extending therethrough and a valve disc journaled therein for rotation between open and closed positions by means of a sealing construction formed of two side-by-side sealing members disposed within a groove in the passage and each having a nose extending into the passage to sealingly engage the periphery of the valve disc when the latter is in a closed position. At least a portion of the outermost sides of the sealing members are free to move somewhat relative to the outermost portion of the groove with the result that fluid under pressure may pass through the interface between the two sealing members to exert pressure against the outermost sides thereof thereby driving the noses inwardly into firm engagement with the periphery of the disc.

According to the preferred embodiment, the sealing members are held within the groove by a set body of plastic; according to another embodiment, an epoxy resin cast in situ. To insure freedom of movement, as mentioned in the preceding paragraph, the outermost surfaces of the sealing members are coated with a mold release agent.

Other objects and advantages will become apparent from the following specification taken in conjunction with the accompanying drawings.

DESCRIPTION OF THE DRAWINGS

FIG. 1 is a side elevation of a butterfly valve made according to the invention;

FIG. 2 is a fragmentary sectional view illustrating the improved seal of the invention; and FIG. 3 is an extremely enlarged section illustrating a portion of the seal and depicting, in slightly exaggerated form, the pressure sealing effect obtained.

DESCRIPTION OF THE PREFERRED EMBODIMENT

An exemplary embodiment of a butterfly valve embodying the invention is illustrated in FIG. 1 and is seen to include a valve body, generally designated 10, including a fluid passage 12 extending therethrough. Within the passage 12 is a valve disc 14 from which oppositely extending trunnions (not shown) are directed into bores in journal housings 16 and 18 on the valve body 10 for the purpose of journaling the disc 14 for rotation between an open position as shown and one approximately 90° therefrom at which the fluid passage 12 is closed.

The upper journal housing 18 mounts an operator 20 which may be either manual or motor driven for the purpose of rotating the disc 14 between the aforesaid open and closed positions.

With reference now to FIG. 2, within the passage 12 in the valve body 10, there is provided an annular groove 22. The radially outermost side portions of the groove 22 are widened as at 24 for securing purposes as will be seen.

Disposed within the annular groove 22 is a pair of sealing elements 26 and 28. The sealing elements 26 and 28 are formed of a flexible material such as rubber and may be formed in strips by extrusion processes of a conventional character to have identical cross sections. Once thus formed, the resulting strip may be cut into appropriate lengths and the ends of each strip joined to define the circular sealing members adapted to sealingly engage the disc 14 about the entire periphery of the latter.

Each of the sealing elements 26 and 28 includes a sealing surface in the form of a nose 30 that projects into the passage 12 to sealingly engage a sealing surface 32 on the periphery of the disc 14. Additionally, each sealing element 26 and 28 includes a peripheral groove 34 and the two sealing elements 26 and 28 are disposed within the annular groove 22 so that their corresponding grooves 34 are oppositely located. That is, they are disposed within the groove 22 such that their grooved surfaces are remote from each other.

The sealing elements 26 and 28 are held in place by a set body of plastic 36. According to the preferred embodiment, the set body of plastic 36 is an epoxy resin cast in situ and introduced into the groove 22 by a passage 38 in the valve body 10 provided for that purpose, while the sealing members 26 and 28 are located within the groove 22 in the position shown. By reason of the greater width of the groove 22 at 24 and the grooves 34, it will be appreciated that sealing elements 26 and 28 will be firmly held in place when the plastic sets up.

In order to provide for pressure sealing, the radially outermost surface 40 of each of the sealing elements 26 and 28 is free to move inwardly away from the set body of plastic 36. According to the preferred embodiment, such freedom is obtained by providing each of the surfaces 40 with a coating 42 of a suitable mold release agent prior to the introduction of the liquid plastic into the bore 36.

The general fabrication procedure is as follows. The sealing members 26 and 28 are located in the groove 22 and the disc 14 is then moved to a closed position to hold the sealing members in place. Liquid plastic is then introduced through the bore 38 to fill up that portion of the groove 22 unoccupied by the seals 26 and 28. The plastic will flow into the grooves 34 in each of the sealing members 26 and 28 and will serve to hold the two in abutment with each other. Normally some pressure will be applied to the liquid plastic as it is introduced through the bore 38 so as to insure that the noses 30 of the sealing elements 26 and 28 will be firmly urged against the sealing surface 32 of the disc 14 and to further cause the seals 26 and 28 to be pushed together at their interface 44. After the desired pressure on the plastic has been attained, the bore 38 may be sealed at an appropriate point, not shown, to maintain the pressure and the plastic cured in place. After the plastic is cured, the valve will be ready for use and it will be appreciated that the noses 30 will be urged against the disc 14 at a pressure approximately equal to that applied on the liquid plastic during the forming process. In addition, the radially outermost surfaces 40 of the seals 26 and 28 will be isolated from fluid in the passage except through the interface 44.

Additional pressure sealing is attained in use as follows. With reference to FIGS. 2 and 3, it will be appreciated that one of the sealing members 26 and 28 on the high pressure side in a fluid system will permit some of the fluid under pressure to flow to the interface 44 between the two sealing members 36 and 28. From this point, it will flow along the interface 44 to the radially outermost surfaces 40 of the sealing members 26 and 28 and will act thereagainst to increase the pressure with which the noses 30 are urged against the sealing surfaces 32 of the disc 14. While the material used to fabricate the sealing members 26 and 28 will generally be substantially incompressible, some movement may occur, which movement is shown in an exaggerated form in dotted lines in FIG. 3. Thus, whenever the pressure in the line exceeds the pressure with which the plastic was introduced into the recess 22 during manufacture, an increased, positive pressure seal will be provided.

It will be appreciated from the foregoing description of the structure and operation of a valve made according to the invention that the pressure seal cannot be rendered partly or wholly ineffective by sedimentation as there is no path or appreciable size by which the fluid controlled can convey sediment to the pressure responsive surfaces of the sealing members 26 and 28. Similarly, there is no need to provide a special pressure conveying passage from the high pressure side of the valve to the pressure responsive surfaces of the sealing elements 26 and 28 and thus, a valve made according to the invention may be fabricated without requiring special machining operations as has been the case with certain prior valve structures.

I claim:

1. A butterfly valve construction comprising:
a valve body having a fluid passage extending therethrough; a valve disc journaled within said passage for rotation between open and closed positions; and sealing means within said body about the periphery of said passage for sealingly engaging the periphery of said disc when said disc is in said closed position, said sealing means comprising a pair of flexible members disposed in side-by-side relationship and each including a nose portion located inwardly of the periphery of said passage for sealingly engaging the periphery of said disc, a body of set plastic material at least partially radially outwardly of said flexible members firmly locating said members in a position to sealingly engage said disc when said disc is in said closed position, at least a portion of the outermost peripheral surface of said members being free to move inwardly and away from said body of set plastic whereby fluid under pressure may flow through the interface between said members to the interface of said outermost peripheral surfaces and said body of set plastic material to exert pressure against said members to urge the nose of at least one of said members into firm sealing engagement with the periphery of said disc when said disc is in said closed position.

2. The valve of claim 1 wherein said body of set plastic material is formed of an epoxy resin cast in situ, and said outermost peripheral surfaces are coated with a mold release agent.

3. The valve of claim 1 wherein each of said members includes a peripheral groove in the side thereof remote from the other of said members, said valve body includes an annular groove radially outwardly of said passage and opening on said passage, said annular groove receiving said members and said set body of plastic.

4. The valve of claim 3 wherein said set body of plastic is cast in situ and said outermost peripheral surfaces are coated with a mold release agent.

5. A butterfly valve construction comprising:
a valve body having a fluid passage extending therethrough; an annular groove within said valve body and opening about said fluid passage; a valve disc journaled within said passage for rotation between open and closed positions; and sealing means within said annular groove about the periphery of said passage for sealingly engaging the periphery of said disc when said disc is in said closed position, said sealing means comprising a pair of abutting flexible members, both within said groove, each having a portion extending from the groove inwardly into said passage to sealingly engage the periphery of said disc when said disc is in said closed position, and each further having a pressure responsive surface opposite said portion and adapted to be subjected to fluid under pressure in a conduit with which said valve may be used, said fluid under pressure flowing through the interface of said flexible members to said pressure responsive surfaces; and means retaining said flexible members within said groove.

6. A butterfly valve according to claim 5 wherein each of said flexible members includes a groove on a side thereof intermediate said pressure responsive surface and said portion, said flexible members being located within said annular groove such that said side grooves are oppositely located from each other, said retaining means including means fixed to said valve body and within the side grooves of the flexible members.

7. A butterfly valve construction according to claim 5 wherein said retaining means comprises a body of set plastic within said annular groove, said pressure responsive surfaces being free for movement relative to said set body of plastic.

8. A butterfly valve construction according to claim 7 wherein said pressure responsive surfaces include a coating of a mold release agent.

* * * * *